(12) United States Patent
Tung et al.

(10) Patent No.: US 8,101,286 B2
(45) Date of Patent: Jan. 24, 2012

(54) COATINGS FOR CLUTCH PLATES

(75) Inventors: Simon Chin-Yu Tung, Rochester Hills, MI (US); Gregory Mordukhovich, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 828 days.

(21) Appl. No.: 12/146,664

(22) Filed: Jun. 26, 2008

(65) Prior Publication Data

US 2009/0321210 A1    Dec. 31, 2009

(51) Int. Cl.
  *B32B 15/04*    (2006.01)
  *F16D 13/60*    (2006.01)
  *F16D 69/02*    (2006.01)

(52) U.S. Cl. ........ 428/622; 428/627; 428/632; 428/686; 192/70.14; 192/107 M

(58) Field of Classification Search .................. None
See application file for complete search history.

(56) References Cited

U.S. PATENT DOCUMENTS

| | | | |
|---|---|---|---|
| 2,367,286 A * | 1/1945 | Keeleric ............................ 51/309 |
| 3,221,853 A * | 12/1965 | Batchelor et al. ........... 192/70.14 |
| 3,378,361 A * | 4/1968 | Harris, Jr ......................... 51/293 |
| 3,941,903 A | 3/1976 | Tucker, Jr. |
| 5,029,686 A * | 7/1991 | Yesnik ....................... 192/70.14 |
| 5,308,367 A | 5/1994 | Julien |
| 5,332,422 A | 7/1994 | Rao |
| 5,352,526 A * | 10/1994 | Solanki et al. ................. 428/422 |
| 5,670,252 A | 9/1997 | Makowiecki et al. |
| 5,833,021 A | 11/1998 | Mensa-Wilmot et al. |
| 6,004,362 A | 12/1999 | Seals et al. |
| 6,190,725 B1 | 2/2001 | Lee et al. |
| 6,447,896 B1 | 9/2002 | Augustine |
| 6,469,278 B1 | 10/2002 | Boyce |
| 6,548,453 B1 | 4/2003 | Narasimhan et al. |
| 6,887,585 B2 | 5/2005 | Herbst-Dederichs |
| 6,994,475 B2 | 2/2006 | Doll et al. |
| 7,052,527 B2 | 5/2006 | Hahmrle et al. |
| 7,135,240 B2 | 11/2006 | Fiala et al. |
| 2003/0148144 A1 | 8/2003 | Gates, Jr. et al. |
| 2004/0209125 A1 | 10/2004 | Yamamoto |
| 2005/0205848 A1 | 9/2005 | Kamiya et al. |
| 2005/0275143 A1 | 12/2005 | Toth |
| 2006/0165973 A1 | 7/2006 | Dumm et al. |
| 2006/0217224 A1 | 9/2006 | Girg et al. |
| 2006/0272909 A1 | 12/2006 | Fuller et al. |
| 2008/0075878 A1 * | 3/2008 | Perrin et al. ................... 427/455 |
| 2008/0102307 A1 * | 5/2008 | Zidar ............................ 428/640 |

FOREIGN PATENT DOCUMENTS

DE        3841331 C1 *   5/1990
JP        8-144045      * 6/1996

* cited by examiner

*Primary Examiner* — John J Zimmerman
(74) *Attorney, Agent, or Firm* — Reising Ethington P.C.

(57) ABSTRACT

A multi-layer coating for a smooth contact surface of a clutch plate and a method for manufacturing the same have been developed. This coating can help reduce the prevalence of clutch shudder, noise, and plate wear that is often encountered in a friction-disc clutch mechanism found in a motor vehicle's powertrain. The multi-layer coating may comprise a relatively soft base layer and one or more relatively hard particle layers overlying the base layer. This combination of layers can help provide stable friction characteristics and thermal properties between clutch plate surfaces. One or more optional bonding layers may also be provided between any two adjacent layers to improve the adherent bonding therebetween. At least some of the layers of the multi-layer coating may be applied by a HVO/AF thermal spray procedure.

11 Claims, 2 Drawing Sheets

COATINGS FOR CLUTCH PLATES

TECHNICAL FIELD

This invention relates generally to clutch plate coatings that help reduce the prevalence of shudder, noise, and wear in transmission systems. More specifically, a multi-layer coating comprising a base layer and one or more overlying hard particle layers may be applied to a smooth clutch plate surface by, for example, a high velocity oxygen/air flame (HVO/AF) procedure. An optional bonding layer may also be provided, for example, between the base layer and an adjacent overlying hard particle layer or between adjacent hard particle layers to improve the adherent bonding between those layers.

BACKGROUND OF THE INVENTION

Motor vehicles are oftentimes provided with a friction-disc clutch mechanism in their powertrain to transmit power between rotating shafts. These clutches can be found in, for example, automatic transmissions, manual transmissions, and limited slip differentials.

One example of a friction-disc clutch mechanism can be found in an automatic transmission and is known as a multi-disc clutch. These clutches are generally used to help control planetary gear sets and are often actuated by springs and/or fluid pressure. They also generally comprise a series of friction plates separated by a corresponding series of reaction plates that, when tightly pressed together due to the clutch being engaged, rotate cooperatively to achieve a desired output from its associated planetary gear set. The friction plates utilized in such a clutch typically possess a layer or coating of a high-friction material that is bonded to or otherwise present at the plate's primary contact surface. The reaction plates, on the other hand, typically have a smooth contact surface for engagement with the friction plates' high-friction surfaces. And the manner in which these friction and reaction plates engage and disengage can affect transmission shift performance and clutch durability.

For instance, the constant engagement and disengagement of a multi-disc clutch—and thus the repeated interlocking of the friction and reaction plates under substantial compressive forces—can sometimes result in an undesirable stick-slip phenomenon known as "clutch shudder." Put differently this term refers to the tendency of clutch plates to momentarily stick and then skid against one another in repeated fashion when the clutch is initially engaged or disengaged. And this stick-slip interaction, along with other powertrain resonances and changing slip speeds, can generate a rather annoying noise or chatter and also accelerate degradation of the clutch plates thus shortening their operational lifespan. These clutch shudder occurrences often occur at high clutch operating temperatures, and under high apply pressures and/or low relative velocities (slip speeds) between opposing plate contact surfaces; mostly because these conditions are likely to facilitate the formation of strong local adhesive bonds between the high-friction surface of the friction plate and the smooth contacting surface of the reaction plate. As a result, a spike in the coefficient of friction occurs and causes the contacting surfaces at the friction interface to operate outside of the desired elasto-hydrodynamic (EHD) regime and instead in the boundary lubrication regime. Moreover, instances of clutch shudder can generate unwanted thermal energy that can affect both transmission operation and clutch plate durability.

As such, a number of efforts have been made to try and minimize the occurrence of clutch shudder. For example, friction modifiers or boundary lubricant additives have been added to the lubrication fluid of wet-clutch mechanisms. But these modifiers and additives tend to be expensive and often deteriorate over time. As another example, surface hardening techniques such as nitriding have been used to manufacture stronger, more wear-resistant clutch components. But these processes tend to be expensive, often require the use of large chambers or machines, and are complicated and tedious procedures to perform in conjunction with clutch components.

Thus, there exists a need to develop a smooth-surfaced clutch plate that can interact with a high-friction surface of adjacent clutch plate in a manner that helps decrease the amount and magnitude of plate-to-plate interactions that lead to clutch shudder, noise, and clutch plate wear.

SUMMARY OF THE INVENTION

A multi-layer coating may be applied to at least a smooth plate surface configured to oppose and engage a high-friction surface of a friction clutch plate. The coating may comprise a relatively soft base layer adhered directly to the smooth plate surface, one or more relatively hard particle layers on top of the base layer, and one or more optional bonding layers to enhance the adherent capabilities of the one or more hard particle layers. And together these layers provide the coating with a thickness of up to about six micrometers.

The base layer may be comprised of a material that can function as a high-temperature lubricant. This material should, at the very minimum, be suitable for use at temperatures associated with clutch operation—normally between about 150° C. and 500° C. Examples of such lubricating materials include hexagonal boron nitride (h-BN), tungsten sulfide ($WS_2$), high quality graphite, soft metal powders such as those of brass and tin-bronze, and combinations thereof. This layer securely anchors the multi-layer coating to the smooth surface on one side and provides a cooperative bonding surface for an overlying hard particle layer on its opposite side. In addition its relatively resilient nature—when compared to the smooth surface and the one or more hard particle layers—helps relieve some of the compressive and shear stresses experienced by the multi-layer coating at the commencement of clutch engagement and disengagement.

The base layer may be applied directly to the smooth plate surface by a high velocity oxygen/fuel or air/fuel (collectively termed HVO/AF) thermal spray procedure. This procedure heats the pre-applied lubricating material to very high temperatures (300-3000° C.) and refines it, if desired, into nano-sized particles before spraying the material onto the smooth plate surface in a melted or near-melted state at up to supersonic velocities (up to about 600 m/s). Upon contact with the cooler plate surface, the hot and at least partially liquefied lubricating material almost immediately resolidifies and becomes sintered to the plate surface; a process that creates a strong and anchoring bond for supporting the multi-layer coating. The versatile and more direct HVO/AF thermal spray coating procedures can also enhance the rate at which coated plates are manufactured. This is so because HVO/AF procedures can be employed in a continuous manufacturing operation in which plates are successively exposed to an HVO/AF gun or nozzle, coated, and then advanced for further processing if necessary.

The one or more hard particle layers may be comprised of particles that have a mohs hardness of about 7.0 or greater. Examples of suitable hard particles include those of tungsten carbide (WC), aluminum oxide ($Al_2O_3$), chromium nitride (CrN), titanium diboride ($TiB_2$), silicon dioxide ($SiO_2$), and combinations thereof In some instances a single hard particle layer may be provided on top of the base layer such that the multi-layer coating is comprised primarily of two layers. But in other instances a series of separate and thinner hard particle layers comprised of the same or different particulate material may be provided over the base layer. In either case the hard particle layer or layers of the multi-layer coating provides the smooth plate surface with a hard, wear-resistant interface for recurring engagement and disengagement with the high-friction surface of a friction plate under normal or severe clutch operating conditions.

A HVO/AF thermal spray procedure similar to before may also be used to deposit the one or more hard particle layers over the base layer or an already-applied hard particle layer. This type of procedure may be helpful in applying the hard particle layer(s) because its high temperature capabilities can at least soften, or even partially liquefy, the hard particulate material such that a quality coating layer can be formed. In the case of applying a hard particle layer over the base layer, such a procedure also helps the softer and more resilient base layer absorb a considerable amount of the hard particles' impact energy and thus protect the underlying smooth surface against damage that may otherwise be caused by, for example, the direct impact of the high-velocity hard particles against the smooth surface. As such this initially-applied hard particle layer is often slightly imbedded into the base layer; a surface interaction that helps bond these distinctive layers together. In the case of applying a hard particle layer over another hard particle layer, an HVO/AF thermal spray procedure produces substantially the same results. That is, the surface interactions achieved in these circumstances are similar to those just described—albeit slightly weaker—and thus operate to help bond distinctive hard particle layers together as well.

The one or more optional bonding layers may be provided between any two adjacent layers where additional bonding strength is desired. For example, a bonding layer may be provided between the base layer and an adjacent hard particle layer or between adjacent hard particle layers. And it is generally thinner than the layers it helps secure so as to not add unnecessary thickness to the multi-layer coating. In fact, when provided, these bonding layer or layers can supplement the adherent effects obtained through use of an HVO/AF thermal spray procedure. Moreover, the one or more bonding layers may be applied by a variety of procedures. For instance, bonding material powders such as NiCrAlY, NiCrAl, NiCr, and Ti may be suspended in a liquid medium and then cold sprayed or brushed onto the plate, or they may be applied by an HVO/AF thermal spray procedure.

The multi-layer coating thus constitutes a combination of 1) a softer cushion-like base layer that provides lubricating characteristics and 2) one or more overlying hard particle layers that provide wear-resistance. This combination of layers can help stabilize both the friction characteristics and thermal properties associated with clutch operation and, as such, can reduce occurrences of clutch shudder, noise, and clutch plate wear. A likely explanation for such effects may be the tribological interaction between the base layer and the overlying hard particle layers and the manner in which they compliment one another. For instance, the one or more hard particle layers provide a high dynamic friction coefficient that promotes rapid clutch plate engagement/disengagement without slippage while also providing strong static clutch torque holding capacity when the clutch is engaged. The base layer, on the other hand, provides a low static friction coefficient that allows for a smooth transition during the instant leading up to clutch lock-up (engagement) as well as at the moment immediately following clutch break-away (disengagement). The ability of the multi-layer coating to facilitate these quicker and less slippery clutch engagements/disengagements can also reduce the amount of heat dissipated at the interface of the clutch plates. This result may further improve clutch cycling as increases in plate surface temperatures contribute to the deterioration of the clutch plates and any transmission fluids in the surrounding area.

In one specific and illustrative embodiment, the multi-layer coating may comprise five layers. The base layer, which is applied directly to the smooth plate surface, comprises hexagonal boron nitride. The next layer is an optional bonding layer that comprises NiCrAlY. Applied over the NiCrAlY optional bonding layer is a hard particle layer that comprises tungsten carbide particles. Overlying this hard particle layer is another optional bonding layer comprising titanium. And lastly, another hard particle layer comprising CrN particles intermixed with titanium is applied over the titanium optional bonding layer.

DESCRIPTION OF PREFERRED EMBODIMENTS

Friction-disc clutch mechanisms are commonly used at numerous locations throughout a vehicle's powertrain to transfer power between a driving shaft and a driven shaft. The operation of such clutch mechanisms generally includes pressing together a pair of opposed clutch plates in which one plate has a high-friction contact surface and the other plate has a relatively smooth contact surface. This forceful engagement between the two plates interlocks them together and causes them to rotate in unison to achieve a desired power transfer. But under certain clutch operating conditions the constant engagement and disengagement of the plates can be approximated by a stick-slip phenomenon in which the plates skid against one another as opposed to cleanly and crisply engaging and disengaging. This occurrence is commonly referred to as clutch shudder. To address this and other related issues, such as wear and noise, a multi-layer coating for application to at least a smooth plate surface of a friction-disc clutch mechanism has been developed.

Figure 1:
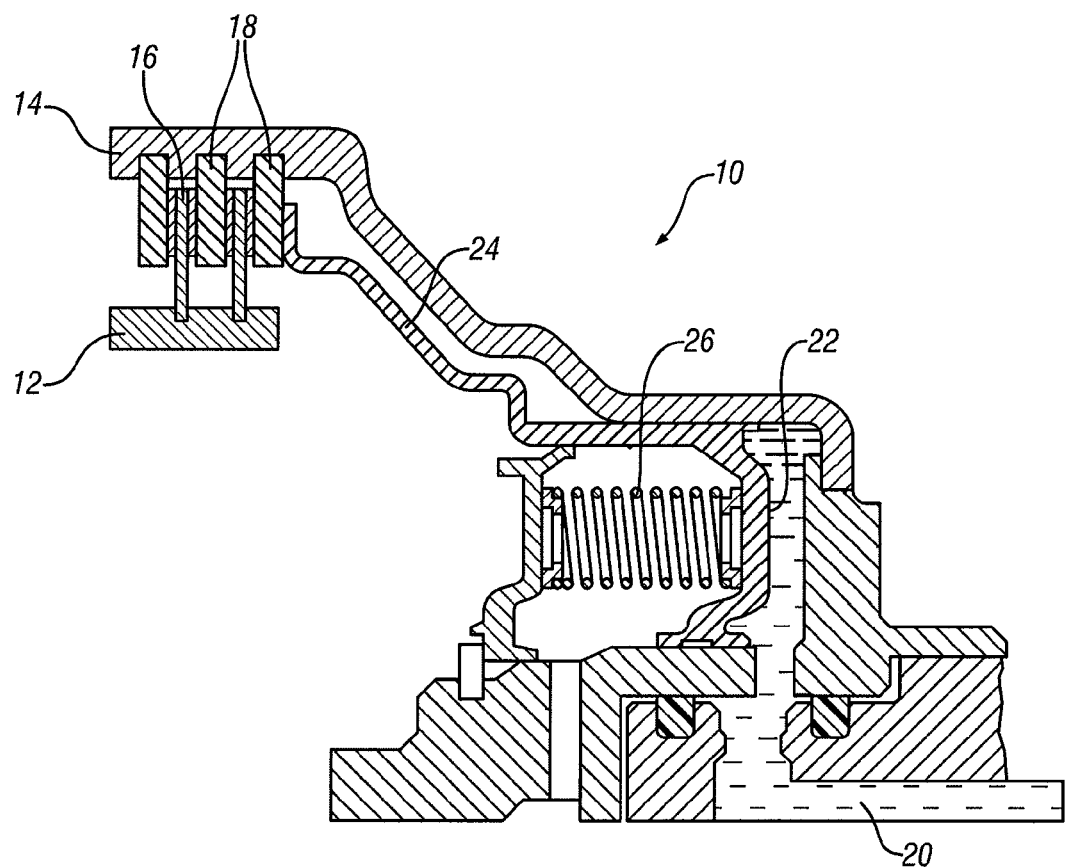
FIG. 1 is a cross-sectional fragmentary view of an exemplary multi-disc clutch that may be utilized, for example, in an automatic transmission.

FIG. 1 shows, as an illustrative embodiment of a friction-disc clutch mechanism, a cutaway portion of a multi-disc clutch 10 for a vehicle automatic transmission. In this embodiment the multi-disc clutch 10 is configured so that, when selectively engaged, it locks together a planetary gear set's sun gear (not shown) and planet carrier 12 and thus forces the planetary gear set (not shown) to rotate as a single unit. Skilled artisans will appreciate, however, that the multi-disc clutch 10 can be configured to engage or lock other gear or drive members together and also to achieve different gear set outcomes when engaged.

The multi-disc clutch 10 shown here is in an engaged state and includes a series of alternating friction plates 16 and reaction plates 18 tightly pressed together. The friction plates 16 are splined along their inner circumference to the planet carrier 12 and the reaction plates 18 are splined along their outer circumference to a sun-gear drum 14. To engage the clutch 10 a pressurized fluid is delivered through a fluid passage 20 and against an apply side 22 of a clutch piston 24 to axially move the piston 24 and squeeze the plates 16, 18 together as shown. The resulting surface interactions between the friction and reaction plates 16, 18 causes them—along with the sun-gear drum 14 and the planet carrier 12—to lock together and thus rotate at the same speed. To foster clutch disengagement, a return spring 26 may be biased against the clutch piston 24 to provide a counter force for retracting the piston 24 whenever the fluid pressure against the apply side 22 of the clutch piston 24 is suitably decreased. The disengagement of the clutch 10 allows the friction and reaction plates 16, 18 to separate and begin rotating independently of one another in association with their respective splined gear members—at least until the clutch 10 is reengaged. Such a clutch engagement/disengagement process may occur repeatedly during normal vehicle operation at each planetary gear set within an automatic transmission to ensure that proper gear shifting is achieved.

Figure 2:
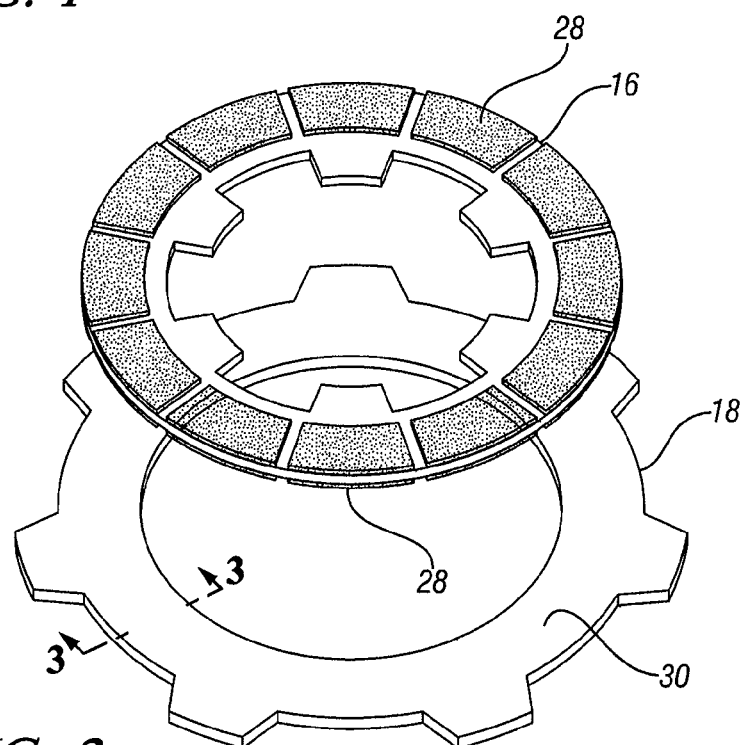
FIG. 2 is a perspective view of a friction plate and a reaction plate spaced apart from one another and suitable for use in the multi-disc clutch of FIG. 1.

Referring now to FIG. 2, there is shown in more detail one of the friction plates 16 and one of the reaction plates 18 of the multi-disc clutch 10. The friction plate 16 may be a typical metal clutch plate that includes a high-friction surface layer 28 that is coated, bonded, or otherwise attached along the plate's 16 contact face. Indeed, the opposite side of the friction plate 16, although not entirely visible, is similarly configured with a similar high-friction surface layer due to the alternating arrangement of the plates 16, 18. The friction plate 16 may be stamped from metals such as steal, cast iron, and aluminum. And a variety of known materials can be utilized to form the high-friction surface layer 28. For example, the high-friction surface layer 28 may comprise paper and cellulose fibers bonded together with Kevlar and having, if desired, a graphite coating for enhancing the material's thermal conductivity. As another example, the high-friction surface layer 28 may comprise sintered bronze particles. Also, as yet another example, the layer 28 may be comprised of woven carbon fibers.

The reaction plate 18, on the other hand, has had a relatively smooth contact surface 30 for engagement with the opposed high-friction layer 28 of the friction plate 16. And it too has been stamped from the metals such as steel, cast iron, and aluminum. But in accordance with this invention at least one surface of the reaction plate is provided with a multi-layer coating for engagement with a friction plate. The coating on the reaction plate is used to reduce or eliminate undesirable stick-slip phenomenon during engagement of reaction plates and friction plates.

Figure 3:
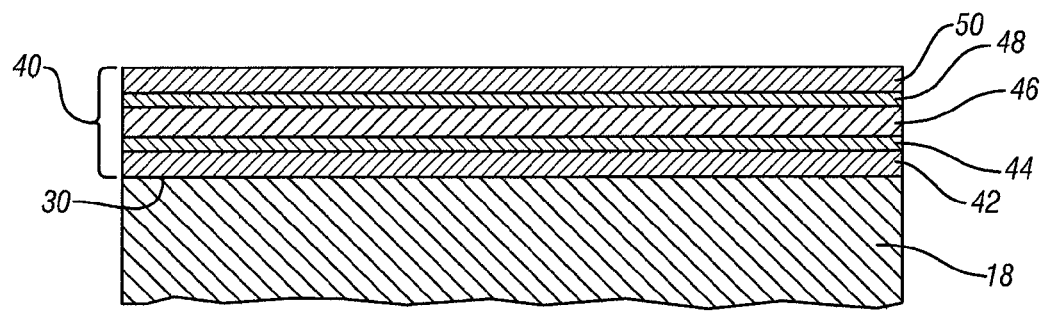
FIG. 3 is a cross-sectional view taken along the line 3-3 of the reaction plate of FIG. 2 and showing a multi-layer coating according to one embodiment of the invention.

As best shown in FIG. 3, the smooth contact surface 30 of the reaction plate 18 may comprise a multi-layer coating 40 to help guard against instances of shudder, wear, and noise that may occur when the friction plate 16 and the reaction plate 18 are continually pressed together and separated. In this particular embodiment the multi-layer coating 40 is about 4.6 μm thick and comprises a base layer 42, a first optional bonding layer 44, a first hard particle layer 46, a second optional bonding layer 48, and a second hard particle layer 50. These layers, although depicted in FIG. 3 in an idealized manner, may in actuality be more rugged along their interfaces and not perfectly uniform in thickness. But nonetheless FIG. 3 provides a fair representation of the general order of these layers.

The base layer 42 of this embodiment is comprised of hexagonal boron nitride (h-BN). This material is suitable for use as the base layer 42 because it can provide the contact surface 30 with a sufficient lubricity at high surface temperatures to help prevent localized sticking with the high-friction layer 28 of the friction plate 16 during constant clutch 10 engagement/disengagement cycles. For example, surface temperatures at the interface between the plates 16, 18 can reach as high as 500° C. Hexagonal BN also helps the base layer 42 resiliently support the overlying hard particle layers 46, 50. This allows the base layer 42 to function in a shock-absorbing manner during initial contact between the reaction plate's contact surface 30 and the high-friction layer 28 of the friction plate 16 or during the instant when the contact surface 30 and the high-friction layer 28 break away and the plates 16, 18 begin to separate. As a result the base layer 42 can alleviate the compressive and shear stresses experienced by the multi-layer coating 40 and thus help reduce momentary spikes of those stresses. Moreover, h-BN is a relatively soft crystalline powder. And as such it can be easily refined, if desired, into nanosized particles, and can additionally be applied to the contact surface 30 of the reaction plate 18 in a variety of fashions that promote quality bonding characteristics. The base layer 42 of this embodiment also has a thickness of about 1.2 μm. But in general this thickness may vary, depending on the desired lubricity, from a little less than one micrometer to a little more than two micrometers.

Figure 4:
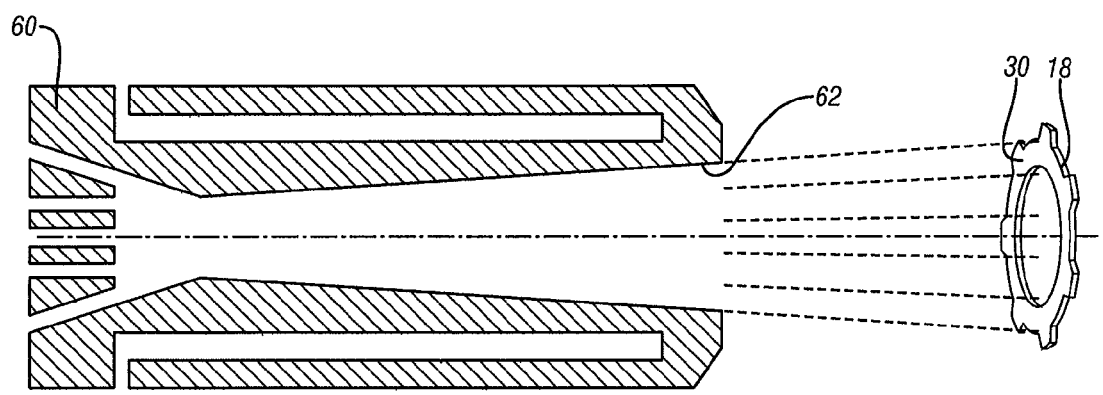
FIG. 4 is a schematic representation of a HVO/AF thermal spray procedure that may be used to help deposit the multi-layer coating of FIG. 3 onto a plate surface.

The base layer 42 may be applied directly to the contact surface 30 of the reaction plate 18 by a high-velocity oxygen/air fuel (HVO/AF) thermal spray procedure. Such a procedure is known and understood by skilled artisans and thus need only be described by the simplified schematic illustration provided in FIG. 4. But in any event an example of an appropriate HVO/AF thermal spraying apparatus that may be utilized here can be found in United States Patent Publication 2006/0037533. In general, and returning now to FIG. 4, an HVO/AF thermal spray procedure involves feeding h-BN powder along with a calculated or otherwise determined high-pressure mixture of air/oxygen and fuel into a combustion chamber 60 for heating, and then spraying at high velocity the heated and possibly somewhat liquefied h-BN material through an ejection nozzle or jets 62 aimed toward the contact surface 30 of the reaction plate 18. A temperature of up to about 3000° C. or higher can be achieved, if desired, inside the combustion chamber 60 as a result of the combustion reaction. But temperatures this elevated are not usually necessary for spraying h-BN. The nozzle or jets 62 can also spray the h-BN at up to supersonic velocities in the neighborhood of 600 m/s. These HVO/AF parameters—the combustion temperature and spray velocity—can nonetheless be predictably controlled by manipulating at least a few process variables. For example, the particular fuel used, the ratio of fuel/oxidant flow rates, and the combustion pressure inside the combustion chamber 60 can individually and collectively affect the HVO/AF procedure's combustion temperature and spray velocity. And skilled artisans will know or be able to determine through experience how to devise and/or optimize a HVO/AF thermal spray procedure and its process variables for spraying a thin layer of h-BN onto the reaction plate 18. Moreover, as a practical matter, HVO/AF thermal spray procedures are amenable to high-output manufacturing processes in which a single HVO/AF thermal sprayer can successively deposit a base layer 42 on a continuous feed of reaction plates.

HVO/AF thermal spray procedures such as this can help form a strong and anchoring bond between the layer 42 and the metal contact surface 30 of the reaction plate 18. This is so because the hot and likely partially melted h-BN that is expelled from the nozzle or jets 62 immediately begins to resolidify and sinter itself to the contact surface 30 upon contact with the cooler reaction plate 18. Among other things this bond functions to support the other overlying layers 44, 46, 48, 50 of the multi-layer coating 40 and ensure that the coating 40 is not easily removed from the reaction plate's contact surface 30.

While the base layer 42 of this embodiment is comprised of h-BN and applied by a HVO/AF thermal spray procedure, it should be noted that other high-temperature lubricating materials and other application procedures may be used to achieve substantially the same effects. Examples of other such alternative lubricating materials include tungsten sulfide ($WS_2$), high quality graphite, and soft metal powders such those of brass and tin-bronze, to name but a few. And other procedures capable of depositing the base layer 42 include chemical vapor deposition (CVD), physical vapor deposition (PVD), and magnetron sputtering.

The first optional bonding layer 44 of this embodiment is comprised of NiCrAlY to ensure there is sufficient bonding strength between the base layer 42 and the first hard particle layer 46. NiCrAlY is useful here because it is highly resistant to oxidation and corrosion at relatively high temperatures and is compatible with both the base layer 42 and the first hard particle layer 46. This layer 44 is slightly thinner than the base layer 42, less than one micrometer and usually about 0.5 μm, and can be applied thereto by a number of conventional cold-temperature techniques. For example, an organic suspension of NiCrAlY may be cold sprayed with a hand sprayer or other suitable device onto the base layer 42. In another example a similar organic suspension may be applied to the base layer by a brush. In each case, however, the still elevated temperature of the base layer 42 is sufficient to vaporize any residual solvent and fuse the first optional bonding layer 44 to the base layer 42. But laser remelting or another appropriate heating technique may be employed if additional heating or melting of the first optional bonding layer 44 is necessary.

The first hard particle layer 46 of this embodiment is comprised of tungsten carbide (WC) particles. These particles have a mohs hardness of between 8 and 9 and can thus provide the reaction plate's 18 contact surface 30 with wear-resistant characteristics appropriate for frequent engagement/disengagement cycles with the friction plate's 16 high-friction surface layer 28. The hard particle layer 46 of this embodiment has a thickness of about 1.6 μm. But its thickness may vary by more than twice this amount if only a single hard particle layer is utilized in the multi-layer coating 40. Conversely, the thickness of the hard particle layer 46 may also be reduced to less than one micrometer if additional hard particle layers beyond the second hard particle layer 50 are sought to be incorporated into the multi-layer coating 40. Other alternative hard particles that may be used instead of WC particles to form the first hard particle layer 46 include, but are not limited to, aluminum oxide ($Al_2O_3$), chromium nitride (CrN), titanium diboride ($TiB_2$), silicon dioxide ($SiO_2$), or combinations of such particles.

The first hard particle layer 46 may be applied over the first optional bonding layer 44 by a HVO/AF thermal spray procedure similar to the one utilized to apply the base layer 42. Such a procedure can briefly soften the hard WC particles and thus enhance their bonding capabilities and reduce their collision force upon high-velocity impact with the underlying layers 42, 44 and/or other WC particles. As such a portion of the first hard particle layer 46 may be imbedded into the first optional bonding layer 44 or driven through the first optional bonding layer 44 and imbedded into the base layer 42. This layer-to-layer interface helps maintain the structural integrity of the multi-layer coating 40 by ensuring that the first hard particle layer 46 is sufficiently secured to its underlying layers 42, 44. The portion of the first hard particle layer 46 not in contact with its underlying layers 42, 44 is likewise structurally sound and not easily compromised as the WC particles in those vicinities are fused to one another as a result of the high temperatures and high-velocity collisions experienced when applied by the HVO/AF thermal spray procedure. An alternative procedure that can be used to apply the first hard particle layer 46 and achieve similar results to a HVO/AF thermal spray procedure is magnetron sputtering.

The second optional bonding layer 48 of this embodiment is comprised of titanium (Ti) and serves to help bond the first hard particle layer 46 and the second hard particle layer 50 together. This layer 48, much like the first optional bonding layer 44, is relatively thin when compared to the other layers 42, 46, 50 of the coating 40 and generally measures less than one micrometer. Here, the second optional bonding layer 48 is about 0.5 μm thick. And it may be applied to the first hard particle layer 46 by a HVO/AF thermal spray procedure similar to those already described. As such the second optional bonding layer 48 can fuse to the exposed surface of the first hard particle layer 46 and thus provide a more adherent surface for receiving the second hard particle layer 50.

The second hard particle layer 50 of this embodiment is comprised of titanium and chromium nitride (CrN) particles. The CrN particles utilized here have a mohs hardness comparable to the WC particles employed in the first hard particle layer 46 and thus provide similar wear and abrasion resistant characteristics to the contact surface 30 of the reaction plate 18. The titanium—which, as before, is useful as a bonding material—is intermixed with the CrN particles to ensure that this outermost layer 50 of the multi-layer coating 40 is securely affixed to its underlying layer or layers 48, 46 since it will be in the most direct and immediate contact with the high-friction surface layer 28 of the friction plate 16. The supplemental bonding effects contributed by the intermixed titanium may therefore help avoid a surface breach of the multi-layer coating 40 due to the high temperature and forceful engagements and disengagements experienced at the contact surface 30 of the reaction plate 18 as a result of clutch cycling. The second hard particle layer 50 of this embodiment has a thickness of about 1.0 μm. But of course this thickness is amenable to slight increases or reductions in thickness. Other alternative hard particles that may be used instead of CrN particles to form the second hard particle layer 50 include, but are not limited to, tungsten carbide (WC), aluminum oxide ($Al_2O_3$), titanium diboride ($TiB_2$), silicon dioxide ($SiO_2$), or combinations of such particles.

The second hard particle layer 50 may be applied over the second optional bonding layer 48 by a HVO/AF thermal spray procedure similar to the ones already described. Other alternative procedures, such as magnetron sputtering, may also be used to apply the second hard particle layer 50.

The multi-layer coating 40 may thus be applied to the contact surface 30 of the reaction plate 18 by a manufacturing process that includes a plurality of HVO/AF thermal spray procedures. For example, a first thermal spray procedure may apply the base lubricating layer 42 directly to the contact surface 30. Then, a cold-spraying apparatus in conjunction with a follow-up heating procedure, if necessary, may apply the first optional bonding layer 44 to the base lubricating layer 42. Next, a second HVO/AF thermal spray procedure may apply the first hard particle layer 46 over the first optional bonding layer 44. And finally a third and fourth HVO/AF thermal spray procedure may apply the second optional bonding layer 48 and the second hard particle layer 50, respectively. Such a manufacturing process can thus be configured to successively form the multi-layer coating 40 on a large quantity of reaction plates at a relatively low cost. Or it may be configured to form the multi-layer coating 40 on a large quantity of blanks that can later be fabricated into reaction plates by a suitable metal forming procedure.

The above description of embodiments of the invention is merely exemplary in nature and, thus, variations thereof are not to be regarded as a departure from the spirit and scope of the invention.

The invention claimed is:

1. A multi-layer coating for a smooth plate surface of a friction-disc clutch mechanism that experiences recurring engagement and disengagement with a high-friction surface material of an adjacent plate, the multi-layer coating comprising:
   a base layer bonded to the smooth plate surface and comprising a high-temperature lubricant material; and
   one or more hard particle layers overlying the base layer and comprising particles having a mohs hardness of about 7.0 or greater;
   the multi-layer coating further comprising one or more bonding layers comprising a bonding material between the base layer and a hard particle layer, between two hard particle layers, or both.

2. The multi-layer coating of claim 1, wherein the high-temperature lubricant material is selected from the group consisting of hexagonal boron nitride, tungsten sulfide, and combinations thereof.

3. The multi-layer coating of claim 1, wherein the particles having a mohs hardness of 7.0 or greater are selected from the group consisting of tungsten carbide, aluminum oxide, chromium nitride, titanium diboride, and combinations thereof.

4. The multi-layer coating of claim 1, wherein the bonding material is selected from the group consisting of NiCrAlY, NiCrAl, NiCr, and Ti.

5. The multi-layer coating of claim 1, wherein the base layer comprises hexagonal boron nitride, a first bonding layer bonded to the base layer comprises NiCrAlY, a first hard particle layer bonded to the first bonding layer comprises tungsten carbide particles, a second bonding layer bonded to the first hard particle layer comprises Ti, and a second hard particle layer bonded to the second bonding layer comprises chromium nitride particles intermixed with Ti.

6. The multi-layer coating of claim 1, wherein the multi-layer coating has a thickness of up to about six micrometers.

7. A friction-disc clutch mechanism for use in a motor vehicle powertrain to transfer power between rotating shafts, the friction-disc clutch mechanism comprising:
   a first clutch plate coupled to a first rotatable shaft and having at least one high-friction contact surface;
   a second clutch plate coupled to a second rotatable shaft and having at least one smooth contact surface configured for reoccurring engagement and disengagement with the high-friction contact surface of the first clutch plate so that power can be selectively transferred between the first and second rotatable shafts; and
   a multi-layer coating located on the entirety of the smooth contact surface that engages and disengages the high-friction contact surface of the first clutch plate, and wherein the multi-layer coating comprises a base layer that is bonded directly to the smooth contact surface of the second clutch plate and that comprises a high-temperature lubricant material, and one or more hard particle layers that overlie the base layer and comprise particles having a mohs hardness of about 7.0 or greater; the multi-layer coating further comprising one or more bonding layers comprising a bonding material between the base layer and a hard particle layer, between two hard particle layers, or both.

8. The friction-disc clutch mechanism of claim 7, wherein the high-temperature lubricant material is selected from the group consisting of hexagonal boron nitride, tungsten sulfide, and combinations thereof, the particles having a mohs hardness of 7.0 or greater are selected from the group consisting of tungsten carbide, aluminum oxide, chromium nitride, titanium diboride, and combinations thereof, and the bonding material is selected from the group consisting of NiCrAlY, NiCrAl, NiCr, and Ti.

9. The friction-disc clutch mechanism of claim 7, wherein the base layer comprises hexagonal boron nitride, a first bonding layer bonded to the base layer comprises NiCrAlY, a first hard particle layer bonded to the first bonding layer comprises tungsten carbide particles, a second bonding layer bonded to the first hard particle layer comprises Ti, and a second hard particle layer bonded to the second bonding layer comprises chromium nitride particles intermixed with Ti.

10. The friction-disc clutch mechanism of claim 7, wherein the first clutch plate is a friction plate and the second clutch plate is a reaction plate, and wherein the friction plate and the reaction plate are part of a multi-disc clutch for a vehicle automatic transmission.

11. The friction-disc clutch mechanism of claim 7, wherein the multi-layer coating has a thickness of up to about six micrometers.

* * * * *